J. Walton,
Bail-Ear for Pails.

N° 77,853. Patented May 12, 1868.

Witnesses:
Thed. Fusch
J. A. Service

Inventor:
Jonathan Walton
Per Munn & Co.
Attorneys

United States Patent Office.

JONATHAN WALTON, OF BROOKLYN, NEW YORK.

Letters Patent No. 77,853, dated May 12, 1868; antedated April 30, 1868.

IMPROVEMENT IN BAIL-EARS FOR PAILS.

The Schedule referred to in these Letters Patent and making part of the same.

TO ALL WHOM IT MAY CONCERN:

Be it known that I, JONATHAN WALTON, of the city of Brooklyn, in the county of Kings, and State of New York, have invented a new and useful Improvement in Bail-Ears for Pails; and I do hereby declare that the following is a full, clear, and exact description thereof, which will enable others skilled in the art to make and use the same, reference being had to the accompanying drawings, forming a part of this specification.

This invention relates to a new and useful improvement in bail-ears for wooden pails, and it consists in constructing the ears of wire, bent in proper form, and attaching them to the pail by clinching, as will be hereinafter described.

The present mode of attaching bails to pails is very defective. The wooden pails have simply thin metal plates attached, perforated with holes to receive the ends of the bail, which are bent to enter and hook into them.

Figure 1:
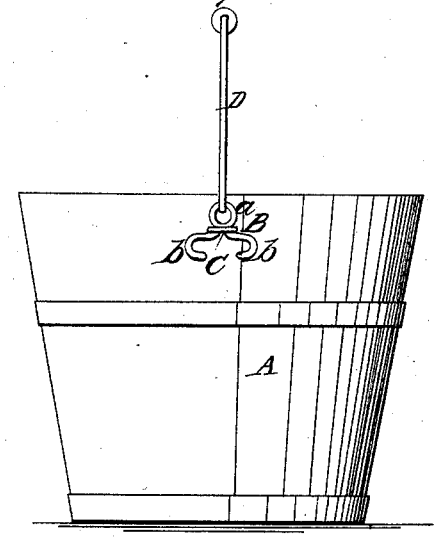

Figure 1 is a side view of a wooden pail having my improvement attached to it.

Figure 2:

Figure 2, a vertical section of a portion of a wooden pail having my improvement applied to it.

A, fig. 1, represents a wooden pail having my improved ears, B, attached to it. These ears are constructed of wire, bent so as to have an eye, $a$, and two prongs, $b\ b$, the latter being inserted in holes in the sides of the pail, passing entirely through the same, and clinched at the inner side, as shown clearly in fig. 1. These ears B are further secured to the pail by staples, C, which encompass the ears just below the eyes $a$, and are also clinched at the inner side of the pail, as also shown in fig. 1.

The ears B are bent or curved so that the eyes $a$ will project outward from the side of the pail, and afford room to admit of the ends of the bail D being passed through them and bent in hook-form, as shown in fig. 1.

Having thus described my invention, what I claim as new, and desire to secure by Letters Patent, is—

The bent wire bail-ears B, constructed as described, the two prongs $b\ b$, passing through the side of the pail A, and clinched upon the inner side, and held in position by means of the staple C, encompassing said ears below the upward-projecting loop $a$, their inner ends also passing through the side of the pail A, and clinched upon the inner side thereof, as herein shown and described.

JONATHAN WALTON.

Witnesses:
WM. F. MCNAMARA,
ALEX. F. ROBERTS.